(12) United States Patent
Imaoka

(10) Patent No.: US 11,501,798 B2
(45) Date of Patent: Nov. 15, 2022

(54) MAGNETIC RECORDING MEDIUM AND MAGNETIC RECORDING AND REPRODUCING DEVICE

(71) Applicant: FUJIFILM Corporation, Tokyo (JP)

(72) Inventor: Noriko Imaoka, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 78 days.

(21) Appl. No.: 16/830,980

(22) Filed: Mar. 26, 2020

(65) Prior Publication Data

US 2020/0312360 A1 Oct. 1, 2020

(30) Foreign Application Priority Data

Mar. 28, 2019 (JP) .............................. JP2019-065034

(51) Int. Cl.
| | |
|---|---|
| *G11B 5/706* | (2006.01) |
| *G11B 5/735* | (2006.01) |
| *G11B 5/008* | (2006.01) |
| *G11B 5/712* | (2006.01) |
| *G11B 5/714* | (2006.01) |

(52) U.S. Cl.
CPC ...... *G11B 5/70678* (2013.01); *G11B 5/00817* (2013.01); *G11B 5/712* (2013.01); *G11B 5/714* (2013.01); *G11B 5/7358* (2019.05)

(58) Field of Classification Search
CPC . G11B 5/00817; G11B 5/70678; G11B 5/712; G11B 5/714; G11B 5/7358; G11B 5/7021; G11B 5/70642; G11B 5/7334
See application file for complete search history.

(56) References Cited

U.S. PATENT DOCUMENTS

| | | | |
|---|---|---|---|
| 6,767,612 B2* | 7/2004 | Doushita | G11B 5/7334 428/842.8 |
| 11,090,716 B2 | 8/2021 | Shirata et al. | |
| 2002/0164504 A1* | 11/2002 | Masaki | G11B 5/70678 428/842.8 |
| 2004/0076855 A1 | 4/2004 | Doushita et al. | |
| 2004/0209121 A1 | 10/2004 | Yajima et al. | |
| 2005/0259342 A1 | 11/2005 | Takeda | |
| 2006/0078711 A1 | 4/2006 | Takeda et al. | |

FOREIGN PATENT DOCUMENTS

| | | |
|---|---|---|
| JP | 2003-115104 A | 4/2003 |
| JP | 2004-319016 A | 11/2004 |
| JP | 2005-339594 A | 12/2005 |
| JP | 2006-099921 A | 4/2006 |
| JP | 2018-092693 A | 6/2018 |

OTHER PUBLICATIONS

Office Action dated Jan. 18, 2022 from the Japanese Patent Office in corresponding Japanese Application No. 2019-065034.

\* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support; and a magnetic layer including a ferromagnetic powder, in which the ferromagnetic powder is a ferromagnetic powder selected from the group consisting of a hexagonal strontium ferrite powder and an ε-iron oxide powder, the number of recesses having a depth which is ⅓ or more of a minimum recording bit length existing on a surface of the magnetic layer is less than 10/10,000 μm², and a ratio $d/t_{mag}$ of a value d which is ⅓ of the minimum recording bit length to a thickness $t_{mag}$ of the magnetic layer is 0.15 to 0.50.

11 Claims, No Drawings

MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2019-065034 filed on Mar. 28, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

A magnetic recording medium has been widely used as a recording medium for recording various data items (for example, see JP2003-115104A).

SUMMARY OF THE INVENTION

It is desired that a magnetic recording medium exhibits excellent electromagnetic conversion characteristics. The magnetic recording medium can be manufactured by forming a magnetic layer including a ferromagnetic powder on a non-magnetic support. As the ferromagnetic powder, a hexagonal barium ferrite powder is used in examples of JP2003-115104A. Meanwhile, in recent years, from a viewpoint of high-density recording suitability, a hexagonal strontium ferrite and an ε-iron oxide powder are attracting attention.

According to one aspect of the invention, an object thereof is to provide a magnetic recording medium including a ferromagnetic powder selected from the group consisting of a hexagonal strontium ferrite powder and an ε-iron oxide powder in a magnetic layer and capable of exhibiting excellent electromagnetic conversion characteristics.

According to one aspect of the invention, there is provided a magnetic recording medium comprising: a non-magnetic support; and a magnetic layer including a ferromagnetic powder, in which the ferromagnetic powder is a ferromagnetic powder selected from the group consisting of a hexagonal strontium ferrite powder and an ε-iron oxide powder, the number of recesses having a depth which is ⅓ or more of a minimum recording bit length existing on a surface of the magnetic layer (hereinafter, also simply referred to as the "number of recesses") is less than 10/10,000 am$^2$, and a ratio $d/t_{mag}$ of a value d which is ⅓ of the minimum recording bit length to a thickness $t_{mag}$ of the magnetic layer (hereinafter, also simply referred to as a "ratio $d/t_{mag}$") is 0.15 to 0.50.

In one aspect, the magnetic recording medium may further include a non-magnetic layer including a non-magnetic powder between the non-magnetic support and the magnetic layer.

In one aspect, the magnetic recording medium may further include a back coating layer including a non-magnetic powder on a surface of the non-magnetic support opposite to a surface provided with the magnetic layer.

In one aspect, the ratio $d/t_{mag}$ may be 0.20 to 0.50.

In one aspect, the number of recesses may be 1/10,000 μm$^2$ to 9/10,000 μm$^2$.

In one aspect, the magnetic recording medium may be a magnetic tape.

According to another aspect of the invention, there is provided a magnetic recording and reproducing device comprising: the magnetic recording medium; and a magnetic head.

In one aspect, a minimum recording bit length of the magnetic recording and reproducing device may be 10 nm to 40 nm.

According to one aspect of the invention, it is possible to provide a magnetic recording medium including a ferromagnetic powder selected from the group consisting of a hexagonal strontium ferrite powder and an ε-iron oxide powder in a magnetic layer, and capable of exhibiting excellent electromagnetic conversion characteristics. In addition, according to one aspect of the invention, it is possible to provide a magnetic recording and reproducing device including such a magnetic recording medium.

DESCRIPTION OF THE PREFERRED EMBODIMENTS

Magnetic Recording Medium One aspect of the invention relates to a magnetic recording medium including: a non-magnetic support; and a magnetic layer including a ferromagnetic powder, in which the ferromagnetic powder is a ferromagnetic powder selected from the group consisting of a hexagonal strontium ferrite powder and an ε-iron oxide powder, the number of recesses having a depth which is ⅓ or more of a minimum recording bit length existing on a surface of the magnetic layer is less than 10/10,000 μm$^2$, and a ratio d/tag of a value d which is ⅓ of the minimum recording bit length to a thickness $t_{mag}$ of the magnetic layer is 0.15 to 0.50.

In the invention and the specification, the "surface of the magnetic layer" is identical to the surface of the magnetic recording medium on the magnetic layer side. In the invention and the specification, the depth of the recess and the number of recesses existing on the surface of the magnetic layer are obtained by measurement using an atomic force microscope (AFM). The measurement region is a region having a size of 40 μm×40 μm. The measurement is performed at three different measurement portions on the surface of the magnetic layer (n=3). The number of recesses having a depth which is ⅓ or more of a minimum recording bit length is obtained as a value (that is, value which is 6.25 times the value) obtained by converting an arithmetical mean of three values obtained by such measurement into a numerical value per 10,000 μm$^2$. The recesses having a depth which is ⅓ or more of a minimum recording bit length existing in the measurement region may include a recess, a part of which exists in the measurement region and the other part of which is not in the measurement region. In a case of obtaining the number of recesses, the number of recesses is measured by including such a recess. Regarding the depth of the recess, a surface where volumes of a projection component and a recess component in the measurement region are equivalent to each other is determined as a reference surface, in a planar image of the surface of the magnetic layer obtained using the AFM, and a distance from this reference surface and the deepest portion of the recess is set as the depth of the recess. As an example of the measurement condition of the AFM, the following measurement conditions can be used.

The measurement regarding a region of the surface of the magnetic layer of the magnetic recording medium having an area of 40 μm×40 μm is performed with an AFM (Nanoscope 4 manufactured by Veeco Instruments, Inc.) in a tapping mode. RTESP-300 manufactured by BRUKER is used as a probe, a resolution is set as 512 pixels×512 pixels, and a scan speed is set by the measurement regarding 1 screen (512 pixels×512 pixels) for 341 seconds.

The "minimum recording bit length" is a length which is ½ of a shortest wavelength (shortest recording wavelength) of a magnetic signal recorded on the magnetic recording medium. From a viewpoint of realization of high-density recording, short wavelength recording is preferably performed, and from this viewpoint, the minimum recording bit length is preferably less than 50 nm and more preferably equal to or less than 40 nm. In addition, the minimum recording bit length can be, for example, 5 nm to 10 nm. In the calculation of the ratio $d/t_{mag}$, values with the same unit are used as the minimum recording bit length and a thickness of the magnetic layer. The unit can be, for example, "nm" or "μm".

In the magnetic recording medium, the number of recesses having a depth which is ⅓ or more of a minimum recording bit length existing on the surface of the magnetic layer is less than $10/10,000 \ \mu m^2$. Regarding the number of recesses on the surface of the magnetic layer, JP2003-115104A described above discloses that the number of recesses having a depth which is ⅓ or more of a minimum recording bit length existing on the surface of the magnetic layer is set to be $100/10,000 \ \mu m^2$ (see claim 1 in JP2003-115104A). With respect to this, as a result of intensive studies, the inventors have newly found that decreasing of an upper limit of the number of recesses having a depth which is ⅓ or more of a minimum recording bit length existing on the surface of the magnetic layer to be less than $100/10,000 \ \mu m^2$ which is the upper limit disclosed in JP2003-115104A, and setting the thickness of the magnetic layer as a thickness for obtaining the ratio $d/t_{mag}$ with the value d which is ⅓ of the minimum recording bit length of 0.15 to 0.50 contribute to further improvement of electromagnetic conversion characteristics of the magnetic recording medium including a ferromagnetic powder selected from the group consisting of a hexagonal strontium ferrite powder and an ε-iron oxide powder in a magnetic layer. The magnetic layer including the ferromagnetic powder selected from the group consisting of a hexagonal strontium ferrite powder and an ε-iron oxide powder generally has a higher anisotropy magnetic field Hk compared that of a magnetic layer including a ferromagnetic powder (for example, a hexagonal barium ferrite powder used in examples of JP2003-115104A) used in a magnetic recording medium in the related art. This is surmised as a reason for that the recess having a depth which is ⅓ or more of the minimum recording bit length greatly affects the electromagnetic conversion characteristics, in the magnetic recording medium including a magnetic layer including a ferromagnetic powder selected from the group consisting of a hexagonal strontium ferrite powder and an ε-iron oxide powder. Accordingly, the inventors have thought that it is desired to decrease the upper limit of the number of recesses having a depth which is ⅓ or more of the minimum recording bit length to be less than the upper limit disclosed in JP2003-115104A, in order to further improve the electromagnetic conversion characteristics of the magnetic recording medium including a magnetic layer including a ferromagnetic powder selected from the group consisting of a hexagonal strontium ferrite powder and an ε-iron oxide powder. In addition, as a result of intensive studies of the inventors, it is clear that the ratio $d/t_{mag}$ also affects the electromagnetic conversion characteristics, in the magnetic recording medium including a magnetic layer including a ferromagnetic powder selected from the group consisting of a hexagonal strontium ferrite powder and an ε-iron oxide powder. It is surmised that the reason therefor is that an anisotropy magnetic field Hk of a magnetic layer including a ferromagnetic powder selected from the group consisting of a hexagonal strontium ferrite powder and an ε-iron oxide powder is high.

However, the above description is merely a surmise and the invention is not limited thereto. In addition, the invention is not limited to other surmises disclosed in the specification, either.

Hereinafter, the magnetic recording medium will be further described in detail.

Magnetic Layer

Number of Recesses Having Depth Which is ⅓ or More of Minimum Recording Bit Length Existing on Surface of Magnetic Layer The number of recesses having a depth which is ⅓ or more of a minimum recording bit length existing on a surface of the magnetic layer of the magnetic recording medium is less than $10/10,000 \ \mu m^2$, and from a viewpoint of further improving electromagnetic conversion characteristics, the number of recesses is preferably equal to or less than $9/10,000 \ \mu m^2$, more preferably equal to or less than $8/10,000 \ \mu m^2$, even more preferably equal to or less than $7/10,000 \ \mu m^2$, still preferably equal to or less than $6/10,000 \ \mu m^2$, and still more preferably equal to or less than $5/10,000 \ \mu m^2$. The number of recesses can also be $0/10,000 \ \mu m^2$, and can also be equal to or more than $0/10,000 \ \mu m^2$, more than $0/10,000 \ \mu m^2$, or equal to or more than $1/10,000 \ \mu m^2$. A controlling method of the number of recesses will be described later.

Ratio $d/t_{mag}$

In the magnetic recording medium, the ratio $d/t_{mag}$ of a value d which is ⅓ of the minimum recording bit length to a thickness $t_{mag}$ of the magnetic layer is equal to or more than 0.15, and from a viewpoint of further improving electromagnetic conversion characteristics by performing noise reduction, the ratio $d/t_{mag}$ is preferably equal to or more than 0.16, more preferably equal to or more than 0.17, even more preferably equal to or more than 0.18, still preferably equal to or more than 0.19, and still more preferably equal to or more than 0.20. In addition, the ratio $d/t_{mag}$ is equal to or less than 0.50, and from a viewpoint of further improving electromagnetic conversion characteristics by preventing an output decrease, the ratio $d/t_{mag}$ is preferably equal to or less than 0.45, more preferably equal to or less than 0.40, and even more preferably equal to or less than 0.35.

Ferromagnetic Powder

A magnetic layer of the magnetic recording medium includes a ferromagnetic powder selected from the group consisting of a hexagonal strontium ferrite powder and an ε-iron oxide powder. It is preferable to use a ferromagnetic powder having a small average particle size, from a viewpoint of improving a recording density. From this viewpoint, the average particle size of the ferromagnetic powder is preferably equal to or smaller than 50 nm, more preferably equal to or smaller than 45 nm, even more preferably equal to or smaller than 40 nm, still preferably equal to or smaller than 35 nm, still more preferably equal to or smaller than 30 nm, still even more preferably equal to or smaller than 25 nm, and still further more preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

The magnetic layer of the magnetic recording medium may include only a hexagonal strontium ferrite powder, only an ε-iron oxide powder, or a hexagonal strontium ferrite powder and an ε-iron oxide powder, as the ferromagnetic powder. Hereinafter, the hexagonal strontium ferrite powder and the ε-iron oxide powder will be described in detail.

Hexagonal Strontium Ferrite Powder

In the invention and the specification, the "hexagonal ferrite powder" is ferromagnetic powder in which a hexagonal ferrite type crystal structure is detected as a main phase by X-ray diffraction analysis. The main phase is a structure to which a diffraction peak at the highest intensity in the X-ray diffraction spectrum obtained by the X-ray diffraction analysis belongs. For example, in a case where the diffraction peak at the highest intensity in the X-ray diffraction spectrum obtained by the X-ray diffraction analysis belongs to the hexagonal ferrite type crystal structure, it is determined that the hexagonal ferrite type crystal structure is detected as the main phase. In a case where only a single structure is detected by the X-ray diffraction analysis, this detected structure is the main phase. The hexagonal ferrite type crystal structure includes at least an iron atom, a divalent metal atom, and an oxygen atom, as the constituent atom. A divalent metal atom is a metal atom which can be divalent cations as ions, and examples thereof include an alkaline earth metal atom such as a strontium atom, a barium atom, or a calcium atom, and a lead atom. In the invention and the specification, the hexagonal strontium ferrite powder is powder in which main divalent metal atom included in this powder is a strontium atom. In addition, the hexagonal barium ferrite powder is powder in which the main divalent metal atom included in this powder is a barium atom. The main divalent metal atom is a divalent metal atom occupying the greatest content in the divalent metal atom included in the powder based on atom %. Here, the rare earth atom is not included in the divalent metal atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

An activation volume of the hexagonal strontium ferrite powder is preferably 800 to 1500 $nm^3$. The atomized hexagonal strontium ferrite powder having the activation volume in the range described above is suitable for manufacturing a magnetic recording medium exhibiting excellent electromagnetic conversion characteristics. The activation volume of the hexagonal strontium ferrite powder is preferably equal to or greater than 800 $nm^3$, and can be, for example, equal to or greater than 850 $nm^3$. In addition, from a viewpoint of further improving electromagnetic conversion characteristics, the activation volume of the hexagonal strontium ferrite powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc = 2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder.

The surface layer portion of the invention and the specification means a part of the region of the particles configuring the hexagonal strontium ferrite powder towards the inside from the surface.

In a case where the hexagonal strontium ferrite powder includes the rare earth atom, the rare earth atom content (bulk content) is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproduction output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]= $10^6/4\pi$ [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device.

In one aspect, the hexagonal strontium ferrite powder does not include a bismuth atom (Bi).

In a case where the magnetic recording medium includes the hexagonal strontium ferrite powder in the magnetic layer, the anisotropy magnetic field Hk of the magnetic layer is preferably equal to or greater than 14 kOe, more preferably equal to or greater than 16 kOe, and even more preferably equal to or greater than 18 kOe. In addition, the anisotropy magnetic field Hk of the magnetic layer is preferably equal to or smaller than 90 kOe, more preferably equal to or smaller than 80 kOe, and even more preferably equal to or smaller than 70 kOe.

The anisotropy magnetic field Hk of the invention and the specification is a magnetic field in which magnetization is saturated, in a case where a magnetic field is applied in a difficult-to-magnetize axis direction. The anisotropy magnetic field Hk can be measured using a well-known measurement device capable of measuring magnetic properties such as an oscillation sample type magnetic-flux meter. In the magnetic layer including the hexagonal strontium ferrite powder, the difficult-to-magnetize axis direction of the magnetic layer is an in-plane direction.

ε-Iron Oxide Powder

In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis is belonged to the ε-iron oxide type crystalline structure, it is determined that the ε-iron oxide type crystalline structure is detected as a main phase. As a producing method of the ε-iron oxide powder, a producing method from a goethite, a reverse micelle method, and the like are known. All of the producing methods are well known. In addition, for the method of producing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the method described here.

An activation volume of the ε-iron oxide powder is preferably 300 to 1500 nm$^3$. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 nm$^3$, and can also be, for example, equal to or greater than 500 nm$^3$. In addition, from a viewpoint of further improving the electromagnetic conversion characteristics, the activation volume of the ε-iron oxide powder is more preferably equal to or smaller than 1400 nm$^3$, even more preferably equal to or smaller than 1300 nm$^3$, still preferably equal to or smaller than 1200 nm$^3$, and still more preferably equal to or smaller than 1100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproduction output in a case of reproducing data recorded on a magnetic recording medium, it is desirable that the mass magnetization σs of ferromagnetic powder included in the magnetic recording medium is high. In regard to this point, in one aspect, σs of the ε-iron oxide powder can be equal to or greater than 8 A·m$^2$/kg and can also be equal to or greater than 12 A·m$^2$/kg. On the other hand, from a viewpoint of noise reduction, σs of the ε-iron oxide powder is preferably equal to or smaller than 40 A·m$^2$/kg and more preferably equal to or smaller than 35 A·m$^2$/kg.

In a case where the magnetic recording medium includes the ε-iron oxide powder in the magnetic layer, the anisotropy magnetic field Hk of the magnetic layer is preferably equal to or greater than 18 kOe, more preferably equal to or greater than 30 kOe, and even more preferably equal to or greater than 38 kOe. In addition, the anisotropy magnetic field Hk of the magnetic layer is preferably equal to or smaller than 100 kOe, more preferably equal to or smaller than 90 kOe, and even more preferably equal to or smaller than 75 kOe. In the magnetic layer including the ε-iron oxide powder, the difficult-to-magnetize axis direction of the magnetic layer is an in-plane direction.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

A content (filling percentage) of the ferromagnetic powder in the magnetic layer is preferably 50% to 90% by mass and more preferably 60% to 90% by mass. The components other than the ferromagnetic powder of the magnetic layer are at least a binding agent, and one or more kinds of additives may be randomly included. A high filling percentage of the ferromagnetic powder in the magnetic layer is preferable from a viewpoint of improvement of recording density.

Binding Agent and Curing Agent

The magnetic recording medium can be a coating type magnetic recording medium and include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later. For the binding agent described above, description disclosed in paragraphs 0028 to 0031 of JP2010-024113A can be referred to. In addition, the binding agent may be a radiation curable resin such as an electron beam curable resin. For the radiation curable resin, a description disclosed in paragraphs 0044 and 0045 of JP2011-048878A can be referred to. A content of the binding agent in the magnetic layer forming composition used can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic recording medium. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of each layer such as the magnetic layer.

Additives

The magnetic layer may include one or more kinds of additives, if necessary. As the additives, a commercially available product can be suitably selected and used in accordance with the desired properties. In addition, a compound synthesized by a well-known method can be used as the additive. The additive can be used with a random amount. As an example of the additive, the curing agent is used. Examples of the additive which can be included in the magnetic layer include a non-magnetic powder (for example, inorganic powder, carbon black, or the like), a lubricant, a dispersing agent, a dispersing assistant, an antibacterial agent, an antistatic agent, and an antioxidant. For example, for the lubricant, a description disclosed in paragraphs 0030 to 0033, 0035, and 0036 of JP2016-126817A can be referred to. The lubricant may be included in the non-magnetic layer which will be described later. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. In addition, as the non-magnetic powder which may be included in the magnetic layer, non-magnetic powder which can function as an abrasive, non-magnetic powder (for example, non-magnetic colloidal particles) which can function as a projection formation agent which forms projections suitably protruded from the surface of the magnetic layer, and the like can be used. For example, for the abrasive, a description disclosed in paragraphs 0030 to 0032 of JP2004-273070A can be referred to. As the projection formation agent, colloidal particles are preferable, and from a viewpoint of availability, inorganic colloidal particles are preferable, inorganic oxide colloidal particles are more preferable, and silica colloidal particles (colloidal silica) are even more preferable. Average particle sizes of the abrasive and the projection formation agent are respectively preferably 30 to 200 nm and more preferably 50 to 100 nm.

The magnetic layer described above can be provided directly on a surface of the non-magnetic support or indirectly through a non-magnetic layer.

Non-Magnetic Layer

Next, a non-magnetic layer will be described. The magnetic recording medium may include a magnetic layer directly on the surface of the non-magnetic support or may include a magnetic layer on the surface of the non-magnetic support through a non-magnetic layer including a non-magnetic powder. The non-magnetic powder used in the non-magnetic layer may be an inorganic powder or an organic powder. In addition, carbon black and the like can be used. Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. In addition, in one aspect, red iron oxide can be used as the non-magnetic powder. For carbon black which can be used in the non-magnetic layer, a description of paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Regarding the recesses existing on the surface of the magnetic layer, in the tape-shaped magnetic recording medium (magnetic tape), for example, in a state where the magnetic tape is wound around a reel or the like and the surface of the magnetic layer comes into contact with a surface on a rear surface side (for example, a surface of a non-magnetic support or a surface of a back coating layer), the shape of the surface on the rear surface side is transferred to the surface of the magnetic layer (so-called offset), and accordingly, the recesses may be formed on the surface of the magnetic layer. As the non-magnetic layer positioned on a lower layer of the magnetic layer is thin, the offset tends to be prevented. As a result, the number of the recesses on the surface of the magnetic layer tends to decrease. In addition, the offset may be prevented by adjusting the composition of the non-magnetic layer. As an example, in the magnetic recording medium including the non-magnetic layer including red iron oxide as the non-magnetic powder, by decreasing the amount of red iron oxide, the offset tends to be prevented. As a result, the number of recesses on the surface of the magnetic layer tends to decrease.

Non-Magnetic Support

Next, a non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including a non-magnetic powder on a surface of the non-magnetic support opposite to the surface provided with the magnetic layer. As the non-magnetic powder of the back coating layer, the above description regarding the non-magnetic powder included in the non-magnetic layer can be referred to. The non-magnetic powder included in the back coating layer can be preferably one or more kinds of non-magnetic powder selected from the group consisting of inorganic powder and carbon black. In general, the inorganic powder tends to have excellent dispersibility in the back coating layer forming composition, compared to that of carbon black. For example, as the main powder of the non-magnetic powder (non-magnetic powder, the largest amount of which is included based on mass, among the non-magnetic powder) in the back coating layer, the inorganic powder is preferably used. In a case where the non-magnetic powder included in the back coating layer is one or more kinds of the non-magnetic powder selected from the group consisting of the inorganic powder and carbon black, the content of the inorganic powder with respect to 100.0 parts by mass of a total amount of the non-magnetic powder is preferably greater than 50.0 parts by mass and equal to or smaller than 100.0 parts by mass, more preferably 60.0 parts by mass to 100.0 parts by mass, even more preferably 70.0 parts by mass to 100.0 parts by mass, and still more preferably 80.0 parts by mass to 100.0 parts by mass.

An average particle size of the non-magnetic powder can be, for example, 10 to 200 nm. The average particle size of the inorganic powder is preferably 50 to 200 nm and more preferably 80 to 150 nm. Meanwhile, the average particle size of the carbon black is preferably 10 to 50 nm and more preferably 15 to 30 nm.

In addition, the dispersibility of the non-magnetic powder in the back coating layer forming composition can be increased by using a well-known dispersing agent, reinforcing dispersion conditions, and the like.

The back coating layer can include a binding agent or can also include additives. In regards to the binding agent included in the back coating layer and additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is, for example, 3.0 to 80.0 rpm, preferably 3.0 to 50.0 µm, and more preferably 3.0 to 10.0 µm.

A thickness $t_{mag}$ of the magnetic layer may be any value, as long as the ratio $d/t_{mag}$ is in the range described above. From a viewpoint of high-density recording required in the recent years, the thickness $t_{mag}$ of the magnetic layer is preferably equal to or smaller than 100 nm. The thickness of the magnetic layer is more preferably 10 nm to 100 nm and even more preferably 20 to 90 nm. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 m and preferably 0.1 to 1.0 µm.

A thickness of the back coating layer is preferably equal to or smaller than 0.9 µm and even more preferably 0.1 to 0.7 µm.

The thicknesses $t_{mag}$ of the magnetic layer is obtained by the following method. A cross section of the magnetic recording medium in a thickness direction is exposed by a well-known method of ion beams or microtome, and regarding the exposed cross section, an SEM image of the cross section is obtained by a scanning electron microscope (SEM). The SEM image of the cross section is obtained regarding each of 10 points randomly extracted. Regarding the 10 images obtained by doing so, the thickness of the magnetic layer is measured in 1 portion of each SEM image randomly extracted. As an arithmetical mean of 10 measured values obtained regarding 10 images, the thickness $t_{mag}$ of the magnetic layer is obtained. In a case of obtaining the thickness of the magnetic layer, an interface between the magnetic layer and a portion adjacent thereto (for example, non-magnetic layer) can be specified by a method disclosed in a paragraph 0029 of JP2017-33617A.

The thickness of the non-magnetic layer and other thicknesses can also be obtained in the same manner as described above.

Manufacturing Step

Composition for forming the magnetic layer, the non-magnetic layer, or the back coating layer generally includes a solvent, together with the various components described above. As the solvent, one kind or two or more kinds of various solvents generally used for manufacturing a coating type magnetic recording medium can be used. The content of the solvent in each layer forming composition is not particularly limited. For the solvent, a description disclosed in a paragraph 0153 of JP2011-216149A can be referred to. A concentration of solid content and a solvent composition in each layer forming composition may be suitably adjusted according to handleability of the composition, coating conditions, and a thickness of each layer to be formed. A step of preparing composition for forming the magnetic layer, the non-magnetic layer, or the back coating layer can generally include at least a kneading step, a dispersing step, and a mixing step provided before and after these steps, if necessary. Each step may be divided into two or more stages. All raw materials used in the preparation of each layer forming composition may be added at an initial stage or in a middle stage of each step. In addition, each raw material may be separately added in two or more steps. For example, the binding agent may be separately added in the kneading step, the dispersing step, and a mixing step for adjusting a viscosity after the dispersion. In the manufacturing step of the magnetic recording medium, a well-known manufacturing technology of the related art can be used as a part of step. In the kneading step, an open kneader, a continuous kneader, a pressure kneader, or a kneader having a strong kneading force such as an extruder is preferably used. The details of the kneading step are disclosed in JP1989-106338A (JP-H01-106338A) and JP1989-079274A (JP-H01-079274A). As a disperser, various well-known disperser using a shear force such as a beads mill, a ball mill, a sand mill, or a homogenizer can be used. In the dispersion, the dispersion beads can be preferably used. As dispersion beads, ceramic beads or glass beads are used and zirconia beads are preferable. A combination of two or more kinds of beads may be used. A bead diameter (particle diameter) and a beads filling percentage of the dispersion beads are not particularly limited and may be suitably set according to powder which is a dispersion target. Each layer forming composition may be filtered by a well-known method before performing the coating step. The filtering can be performed by using a filter, for example. the filter used in the filtering, a filter having a hole diameter of 0.01 to 3 m (for example, filter made of glass fiber or filter made of polypropylene) can be used, for example.

The non-magnetic layer and the magnetic layer can be formed by performing multilayer coating of the non-magnetic layer forming composition and the magnetic layer forming composition in order or at the same time. The back coating layer can be formed by applying the back coating layer forming composition to the surface of the non-magnetic support opposite to a surface provided with the non-magnetic layer and the magnetic layer (or to be provided with the non-magnetic layer and/or the magnetic layer). For details of the coating for forming each layer, a description disclosed in a paragraph 0066 of JP2010-231843A can be referred to.

For the other various steps for manufacturing the magnetic recording medium, a description disclosed in paragraphs 0067 to 0070 of JP2010-231843A can be referred to, for example. For example, in an aspect of performing an alignment process, while the coating layer of the magnetic layer forming composition is wet, the alignment process is performed with respect to the coating layer in an alignment zone. For the alignment process, various well-known technologies disclosed in a paragraph 0052 of JP2010-024113A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone. As an example, the magnetic field strength of the homeotropic alignment process can be 0.10 to 0.80 T or 0.10 to 0.60 T. In addition, it is preferable to perform a calender process as a process for increasing a surface smoothness of the magnetic recording medium. Regarding the conditions of the calender process, for example, a calender pressure (linear pressure) can be 200 to 500 kN/m and is preferably 250 to 350 kN/m. A calender temperature (surface temperature of a calender roll) can be, for example, 70° C. to 120° C. and is preferably 80° C. to 100° C., and the calender speed can be, for example, 50 to 300 m/min and is preferably 50 to 200 m/min.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the positions of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is generally accommodated in a magnetic tape cartridge and the magnetic tape cartridge is mounted in a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data to the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of the data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. For other details of the magnetic tape cartridge, a well-known technology can be used.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the aspect, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the aspect of the invention, and well-known technologies can be applied for the other configurations.

For example, in a case of the recording of data on the magnetic recording medium on which the servo pattern is formed and/or the reproducing of the recorded data, first, the tracking is performed by using the servo signal obtained by the reading of the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the recording and/or the reproducing with respect to other data bands. In this case, the servo signal reading element is moved to a predetermined servo band by using the UDIM information described above, and the tracking with respect to the servo band may be started.

The minimum recording bit length, in a case of recording a magnetic signal on the magnetic recording medium for data recording in the magnetic recording and reproducing device, is preferably 10 nm to 40 nm, from a viewpoint of realization of high-density recording.

In addition, according to one aspect of the invention, it is also possible to provide a magnetic recording and reproducing system of recording a magnetic signal on the magnetic recording medium with the minimum recording bit length of 10 nm to 40 nm, and reproducing the recorded magnetic signal, and a magnetic recording and reproducing method of recording a magnetic signal on the magnetic recording medium with the minimum recording bit length of 10 nm to 40 nm, and reproducing the recorded magnetic signal.

Details of the minimum recording bit length in the magnetic recording and reproducing device, the magnetic recording and reproducing system, and the magnetic recording and reproducing method are as described above.

EXAMPLES

Hereinafter, the invention will be described with reference to examples. However, the invention is not limited to aspects shown in the examples. "Parts" in the following description are based on mass. In addition, steps and evaluations described below are performed in an environment of an atmosphere temperature of 23° C.±1° C., unless otherwise noted. "eq" described below indicates equivalent and a unit not convertible into SI unit.

In Table 1 which will be described later, "SrFe1" and "SrFe2" respectively indicate hexagonal strontium ferrite powder, "ε-iron oxide" indicates ε-iron oxide powder, and "BaFe" indicates hexagonal barium ferrite powder having an average particle size of 21 nm.

The activation volume and the anisotropy constant Ku of various ferromagnetic powder shown below are values obtained by the method described above regarding various ferromagnetic powder by using an oscillation sample type magnetic-flux meter (manufactured by Toei Industry Co., Ltd.).

In addition, the mass magnetization σs is a value measured at the magnetic field strength of 15 kOe by using an oscillation sample type magnetic-flux meter (manufactured by Toei Industry Co., Ltd.).

The anisotropy magnetic field Hk of the magnetic layer shown below is a value measured by using an oscillation sample type magnetic-flux meter TM-VSM5050-SMS type (manufactured by Tamakawa Co., Ltd.).

Producing Method of Ferromagnetic Powder

Producing Method 1 of Hexagonal Strontium Ferrite Powder

The "SrFe1" shown in Table 1 is a hexagonal strontium ferrite powder produced by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the produced amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 mL of an acetic acid aqueous solution having a concentration of 1% were added to a glass bottle, and a dispersion process was performed in a paint shaker for 3 hours. After that, the obtained dispersion liquid and the beads were dispersed and put in a stainless steel beaker. The dispersion liquid was left at a liquid temperature of 100° C. for 3 hours, subjected to a dissolving process of a glass component, precipitated with a centrifugal separator, decantation was repeated for washing, and drying was performed in a heating furnace at a furnace inner temperature of 110° C. for 6 hours, to obtain a hexagonal strontium ferrite powder.

Regarding the hexagonal strontium ferrite powder obtained as described above (in Table 1, "SrFe1"), an average particle size was 18 nm, an activation volume was 902 $nm^3$, an anisotropy constant Ku was $2.2 \times 10^5$ $J/m^3$, and a mass magnetization Gs was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: 1/4 degrees
Mask: 10 mm
Scattering prevention slit: 1/4 degrees
Measurement mode: continuous
Measurement time per 1 stage: 3 seconds
Measurement speed: 0.017 degrees per second
Measurement step: 0.05 degrees Producing Method 2 of Hexagonal Strontium Ferrite Powder The "SrFe2" shown in Table 1 is a hexagonal strontium ferrite powder produced by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was cooled and rolled with a water cooling twin roll to produce an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 mL of an acetic acid aqueous solution having a concentration of 1% were added to a glass bottle, and a dispersion process was performed in a paint shaker for 3 hours. After that, the obtained dispersion liquid and the beads were dispersed and put in a stainless steel beaker. The dispersion liquid was left at a liquid temperature of 100° C. for 3 hours, subjected to a dissolving process of a glass component, precipitated with a centrifugal separator, decantation was repeated for washing, and drying was performed in a heating furnace at a furnace inner temperature of 110° C. for 6 hours, to obtain a hexagonal strontium ferrite powder.

Regarding the hexagonal strontium ferrite powder obtained as described above ("in Table 1, "SrFe2"), an average particle size was 19 nm, an activation volume was 1102 $nm^3$, an anisotropy constant Ku was $2.0 \times 10^5$ $J/m^3$, and a mass magnetization σs was 50 A·$m^2$/kg.

Producing Method of ε-Iron Oxide Powder

The "ε-iron oxide" shown in Table 1 is an ε-iron oxide powder produced by the following method. 4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to thermal treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as the conditions described regarding the producing method 1 of the hexagonal strontium ferrite powder above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained ε-iron oxide powder (in Table 1, "ε-iron oxide"), an average particle size was 12 nm, an activation volume was 746 $nm^3$, an anisotropy constant Ku was $1.2 \times 10^5$ $J/m^3$, and a mass magnetization σs was 16 A·$m^2$/kg.

Example 1

(1) List of Magnetic Layer Forming Composition

Magnetic liquid

Ferromagnetic powder (see Table 1): 100.0 parts $SO_3Na$ group-containing polyurethane resin: 14.0 parts
   (Weight-average molecular weight: 70,000, $SO_3Na$ group: 0.4 meq/g)

Cyclohexanone: 150 parts

Methyl ethyl ketone: 150 parts

Abrasive solution A

Alumina abrasive (average particle size: 100 nm): 3.0 parts

Sulfonic acid group-containing polyurethane resin: 0.3 parts (Weight-average molecular weight: 70,000, $SO_3Na$ group: 0.3 meq/g)
   Cyclohexanone: 26.7 parts Abrasive solution B Diamond abrasive (average particle size: 100 nm): 1.0 part Sulfonic acid group-containing polyurethane resin: 0.1 parts
   (Weight-average molecular weight: 70,000, $SO_3Na$ group: 0.3 meq/g)

Cyclohexanone: 26.7 parts

Silica sol

Colloidal silica (average particle diameter: 100 nm): 0.2 parts
Methyl ethyl ketone: 1.4 parts
Other components
Stearic acid: 2.0 parts
Butyl stearate: 10.0 parts
Polyisocyanate (CORONATE manufactured by Tosoh Corporation): 2.5 parts
Finishing Additive Solvent
Cyclohexanone: 200.0 parts
Methyl ethyl ketone: 200.0 parts
(2) List of Non-Magnetic Layer Forming Composition
Red iron oxide: see Table 1
    (Average particle size (average long axis length): 150 nm, average acicular ratio: 7, Brunauer-Emmett-Teller (BET) specific surface area: 52 $m^2/g$)
Carbon black (average particle size: 20 nm): 25.0 parts
$SO_3Na$ group-containing polyurethane resin: 18 parts
    (Weight-average molecular weight: 70,000, $SO_3Na$ group: 0.2 meq/g)
Stearic acid: 1.0 part
Cyclohexanone: 300.0 parts
Methyl ethyl ketone: 300.0 parts
(3) List of Back Coating Layer Forming Composition
Inorganic powder (α-iron oxide): 90.0 parts
    (Average particle size (average long axis length): 150 nm, average acicular ratio: 7, BET specific surface area: 52 $m^2/g$)
Carbon black (average particle size: 20 nm): 10.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 1.0 part
Polyisocyanate: 5.0 parts
Cyclohexanone: 200.0 parts
(4) Manufacturing of Magnetic Tape The magnetic liquid was dispersed by using a batch type vertical sand mill for 24 hours. As dispersion beads, zirconia beads having a bead diameter of 0.5 mm were used. The abrasive solutions A and B were dispersed by a batch type ultrasonic device (20 kHz, 300 W) for 24 hours. These dispersion liquids were mixed with the other components (silica sol, the other components, and the finishing additive solvent) and the dispersion process was performed with a batch type ultrasonic device (20 kHz, 300 W) for 30 minutes. After that, the obtained mixture was filtered with a filter having a hole diameter of 0.5 m, and a magnetic layer forming composition was prepared.

For the non-magnetic layer forming composition, the components were dispersed by using a batch type vertical sand mill for 24 hours. As dispersion beads, zirconia beads having a bead diameter of 0.1 mm were used. The obtained dispersion liquid was filtered with a filter having a hole diameter of 0.5 μm, and a non-magnetic layer forming composition was prepared.

For the back coating layer forming composition, the components described above excluding the lubricant (stearic acid and butyl stearate), polyisocyanate, and cyclohexanone were kneaded and diluted by an open kneader. Then, the obtained mixed liquid was subjected to a dispersion process of 12 passes, with a transverse beads mill dispersing device by using zirconia beads having a particle diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid described above was filtered with a filter having a hole diameter of 1 m and a back coating layer forming composition was prepared.

After that, the non-magnetic layer forming composition was applied on one surface of a biaxial stretching support made of polyethylene naphthalate having a thickness of 5.0 m, and dried, and the magnetic layer forming composition was applied thereon, and accordingly, a coating layer was formed. The thickness of the non-magnetic layer was adjusted according to the coating amount of the non-magnetic layer forming composition, and the thickness of the magnetic layer was adjusted according to the coating amount of the magnetic layer forming composition.

While the coating layer of the magnetic layer forming composition is wet (not dried), a homeotropic alignment process was performed by applying a magnetic field having a magnetic field strength of 0.6 T in a direction vertical to the surface of the coating layer, and the coating layer was dried. After that, the back coating layer forming composition was applied to the opposite surface of the support so that the thickness after drying becomes 0.4 μm, and dried.

Then, a calender process was performed with a calender processing device including a calender roll configured of only a metal roll, at a speed of 100 m/min, linear pressure of 300 kg/cm, and a calender temperature (surface temperature of calender roll) of 100° C., and the heating treatment was performed in the environment of the atmosphere temperature of 70° C. for 36 hours. After the heating treatment, the slitting was performed to have a width of ½ inches (1 inch is 0.0254 meters), and a magnetic tape obtained was wound around a roll-shaped reel. After that, a part of this magnetic tape was used in the evaluation of electromagnetic conversion characteristics, and another part thereof was used in the evaluation of various physical properties.

(5) Evaluation of Electromagnetic Conversion Characteristics

The electromagnetic conversion characteristics (Signal-to-Noise-Ratio (SNR)) were obtained by the following method using a reel tester having a width of ½ inches to which a head was fixed.

A head/tape relative speed was set as 5.5 m/sec, a metal-in-gap (MIG) head (gap length of 0.15 m, track width of 1.0 m) was used as a recording head, and a recording current was set as an optimal recording current of each tape. As a reproducing head, a giant magnetoresistive (GMR) head having an element thickness of 15 nm, a shield interval of 0.1 m, and a lead width of 0.5 m was used. A magnetic signal was recorded at the shortest recording wavelength shown in Table 1, a reproducing signal was measured with a spectrum analyzer manufactured by Shibasoku Co., Ltd., and a ratio of an output of a carrier signal and integral noise over whole spectral range was set as an SNR. As the signal, a sufficiently stabilized portion of the signal after starting the running of the magnetic tape was used. A value of Comparative Example 1 which will be described later was set as 0 dB and an SNR was obtained as a relative value thereof.

Examples 2 to 17, Comparative Examples 1 to 19, and Reference Example

Manufacturing of the magnetic tape and evaluation of the electromagnetic conversion characteristics were performed in the same manner as in Example 1, except that various items were changed as shown in Table 1.

Evaluation of Physical Properties (1) Number of Recesses Having Depth which is ⅓ or More of Minimum Recording Bit Length Existing on Surface of Magnetic Layer The following conditions were used as the measurement conditions of AFM, and regarding each magnetic tape in the examples, the comparative examples, and the reference examples, the number of recesses having a depth which is ⅓ or more of a minimum recording bit length existing on a surface of the magnetic layer was obtained by the method described above.

The measurement regarding a region of the surface of the magnetic layer of the magnetic recording medium having an area of 40 μm×40 μm is performed with an AFM (Nanoscope 4 manufactured by Veeco Instruments, Inc.) in a tapping mode. RTESP-300 manufactured by BRUKER is used as a probe, a resolution is set as 512 pixels×512 pixels, and a scan speed is set by the measurement regarding 1 screen (512 pixels×512 pixels) for 341 seconds.

(2) Thickness of Magnetic Layer and Thickness of Non-Magnetic Layer

A sample for cross section observation was prepared by the following method from each magnetic tape of the examples, the comparative examples, and the reference example. FE-SEM S4800 manufactured by Hitachi, Ltd. which is a field emission type scanning electron microscope (FE-SEM) was used as an SEM for the SEM observation.

(i) A sample of the magnetic tape having a size of a width direction 10 mm×longitudinal direction 10 mm was cut by using a blade.

A protective film was formed on the surface of the magnetic layer of the cut sample to obtain the sample attached with the protective film. The formation of the protective film was performed by the following method.

A platinum (Pt) film (thickness of 30 nm) was formed on the surface of the magnetic layer of the sample by sputtering. The sputtering of the platinum film was performed under the following conditions.

Sputtering Conditions of Platinum Film
Target: Pt
Degree of vacuum in chamber of sputtering device: equal to or smaller than 7 Pa
Current value: 15 mA A carbon film having a thickness of 100 to 150 nm was further formed on the sample attached with platinum film manufactured described above. The formation of the carbon film was performed by a chemical vapor deposition (CVD) mechanism using a gallium ion (Ga$^+$) beam provided with a focused ion beam (FIB) device used in the following section (ii).

(ii) The FIB processing using the gallium ion (Ga$^+$) beam was performed with respect to the sample attached with the protective film manufactured in the section (i) by the FIB device and the cross section of the magnetic tape was exposed. An acceleration voltage in the FIB processing was 30 kV and a probe current was 1300 pA.

The sample for cross section observation exposed as described above was SEM-observed, and an SEM image of the cross section was obtained. Regarding the SEM image, 10 images in total were obtained in 10 portions of the manufactured sample for cross section observation randomly selected. Each SEM image was obtained as a secondary electron image captured at an acceleration voltage of 5 kV, an imaging magnification of 20000, and with 960 pixels (vertical)×1280 pixels (horizontal). An interface between the magnetic layer and the non-magnetic layer was specified by a method disclosed in a paragraph 0029 of JP2017-033617A. An interface between the non-magnetic layer and the non-magnetic support was specified visually observing the SEM image. In one random position on each SEM image, an interval in a thickness direction between the interface between the magnetic layer and the non-magnetic layer and the outermost surface of the magnetic tape on the magnetic layer side was measured, and an arithmetical mean of the values obtained regarding the 10 images was set as a thickness $t_{mag}$ of the magnetic layer. In one random position on each SEM image, an interval in the thickness direction between the interface between the non-magnetic layer and the magnetic layer and the interface with the non-magnetic support was measured, and an arithmetical mean of values obtained regarding the 10 images was set as a thickness of the non-magnetic layer.

The results of the above evaluation were shown in Table 1 (Tables 1-1 to 1-3). Regarding the SNR shown in Table 1, it can be determined that electromagnetic conversion characteristics were excellent, when the SNR is equal to or greater than 1.0 dB, in a case where the minimum recording bit length is 40 nm, when the SNR is equal to or greater than −9.0 dB, in a case where the minimum recording bit length is 30 nm, and when the SNR is equal to or greater than −24.0 dB, in a case where the minimum recording bit length is 20 nm.

TABLE 1-1

|  | Ferromagnetic powder | linear recording density (kbpi) | shortest recording wavelength (nm) | Minimum recording bit length (nm) | Value d which is ⅓ of minimum recording bit length (nm) | Thickness of non-magnetic layer (μm) | Amount of red iron oxide in non-magnetic layer |
|---|---|---|---|---|---|---|---|
| Example 1 | SrFe1 | 635 | 80 | 40 | 13.3 | 1.0 | 100.0 parts by mass |
| Example 2 | SrFe1 | 635 | 80 | 40 | 13.3 | 0.6 | 100.0 parts by mass |
| Example 3 | SrFe2 | 635 | 80 | 40 | 13.3 | 0.6 | 100.0 parts by mass |
| Example 4 | ε-iron oxide | 635 | 80 | 40 | 13.3 | 0.6 | 100.0 parts by mass |
| Example 5 | SrFe1 | 635 | 80 | 40 | 13.3 | 0.3 | 100.0 parts by mass |
| Example 16 | SrFe1 | 635 | 80 | 40 | 13.3 | 0.3 | 100.0 parts by mass |

TABLE 1-1-continued

| | | | | | | | |
|---|---|---|---|---|---|---|---|
| Example 17 | SrFe1 | 635 | 80 | 40 | 13.3 | 0.3 | 100.0 parts by mass |
| Comparative Example 1 | SrFe1 | 635 | 80 | 40 | 13.3 | 1.8 | 100.0 parts by mass |
| Comparative Example 2 | SrFe2 | 635 | 80 | 40 | 13.3 | 1.8 | 100.0 parts by mass |
| Comparative Example 3 | ε-iron oxide | 635 | 80 | 40 | 13.3 | 1.8 | 100.0 parts by mass |
| Comparative Example 4 | SrFe1 | 635 | 80 | 40 | 13.3 | 0.6 | 100.0 parts by mass |
| Comparative Example 5 | SrFe2 | 635 | 80 | 40 | 13.3 | 0.6 | 100.0 parts by mass |
| Comparative Example 6 | ε-iron oxide | 635 | 80 | 40 | 13.3 | 0.6 | 100.0 parts by mass |
| Comparative Example 19 | SrFe1 | 635 | 80 | 40 | 13.3 | 0.6 | 100.0 parts by mass |
| Reference example | BaFe | 635 | 80 | 40 | 13.3 | 1.0 | 100.0 parts by mass |

| | Thickness of magnetic layer $t_{mag}$ (nm) | Magnetic layer Hk (Oe) | $d/t_{mag}$ | Number of recesses having depth which is 1/3 or more of minimum recording bit length (piece/10000 μm²) | SNR (dB) |
|---|---|---|---|---|---|
| Example 1 | 50 | 25 | 0.27 | 8 | 1.6 |
| Example 2 | 50 | 25 | 0.27 | 4 | 2.5 |
| Example 3 | 50 | 19 | 0.27 | 4 | 1.9 |
| Example 4 | 50 | 30 | 0.27 | 3 | 3.0 |
| Example 5 | 50 | 25 | 0.27 | 1 | 3.1 |
| Example 16 | 28 | 25 | 0.48 | 1 | 3.6 |
| Example 17 | 65 | 25 | 0.21 | 1 | 2.6 |
| Comparative Example 1 | 50 | 25 | 0.27 | 18 | 0 (reference) |
| Comparative Example 2 | 50 | 19 | 0.27 | 19 | −0.6 |
| Comparative Example 3 | 50 | 30 | 0.27 | 17 | 0.6 |
| Comparative Example 4 | 100 | 25 | 0.13 | 4 | 0.5 |
| Comparative Example 5 | 100 | 19 | 0.13 | 4 | −0.1 |
| Comparative Example 6 | 100 | 30 | 0.13 | 5 | 0.0 |
| Comparative Example 19 | 20 | 25 | 0.67 | 4 | −1.0 |
| Reference example | 100 | 15 | 0.13 | 7 | 1.0 |

TABLE 1-2

| | Ferromagnetic powder | linear recording density (kbpi) | shortest recording wavelength (nm) | Minimum recording bit length (nm) | Value d which is 1/3 of minimum recording bit length (nm) | Thickness of non-magnetic layer $t_{nonmag}$ (μm) | Amount of red iron oxide in non-magnetic layer |
|---|---|---|---|---|---|---|---|
| Example 6 | SrFe1 | 847 | 60 | 30 | 10.0 | 0.6 | 100.0 parts by mass |
| Example 7 | SrFe2 | 847 | 60 | 30 | 10.0 | 0.6 | 100.0 parts by mass |
| Example 8 | ε-iron oxide | 847 | 60 | 30 | 10.0 | 0.6 | 100.0 parts by mass |
| Example 9 | SrFe1 | 847 | 60 | 30 | 10.0 | 0.6 | 90.0 parts by mass |
| Example 10 | SrFe1 | 847 | 60 | 30 | 10.0 | 0.3 | 100.0 parts by mass |
| Example 11 | SrFe2 | 847 | 60 | 30 | 10.0 | 0.3 | 100.0 parts by mass |
| Example 12 | ε-iron oxide | 847 | 60 | 30 | 10.0 | 0.3 | 100.0 parts by mass |

TABLE 1-2-continued

| | | | | | | | |
|---|---|---|---|---|---|---|---|
| Comparative Example 7 | SrFe1 | 847 | 60 | 30 | 10.0 | 1.2 | 100.0 parts by mass |
| Comparative Example 8 | SrFe2 | 847 | 60 | 30 | 10.0 | 1.2 | 100.0 parts by mass |
| Comparative Example 9 | ε-iron oxide | 847 | 60 | 30 | 10.0 | 1.2 | 100.0 parts by mass |
| Comparative Example 10 | SrFe1 | 847 | 60 | 30 | 10.0 | 0.6 | 100.0 parts by mass |
| Comparative Example 11 | SrFe2 | 847 | 60 | 30 | 10.0 | 0.6 | 100.0 parts by mass |
| Comparative Example 12 | ε-iron oxide | 847 | 60 | 30 | 10.0 | 0.6 | 100.0 parts by mass |

| | Thickness of magnetic layer $t_{mag}$ (nm) | Magnetic layer Hk (Oe) | $d/t_{mag}$ | Number of recesses having depth which is 1/3 or more of minimum recording bit length (piece/10000 μm²) | SNR (dB) |
|---|---|---|---|---|---|
| Example 6 | 50 | 25 | 0.20 | 4 | −7.5 |
| Example 7 | 50 | 19 | 0.20 | 5 | −8.1 |
| Example 8 | 50 | 30 | 0.20 | 3 | −7.0 |
| Example 9 | 50 | 25 | 0.20 | 3 | −7.3 |
| Example 10 | 30 | 25 | 0.33 | 1 | −6.9 |
| Example 11 | 30 | 19 | 0.33 | 2 | −7.5 |
| Example 12 | 30 | 30 | 0.33 | 1 | −6.4 |
| Comparative Example 7 | 50 | 25 | 0.20 | 11 | −9.8 |
| Comparative Example 8 | 50 | 19 | 0.20 | 12 | −11.3 |
| Comparative Example 9 | 50 | 30 | 0.20 | 10 | −10.2 |
| Comparative Example 10 | 100 | 25 | 0.10 | 4 | −9.5 |
| Comparative Example 11 | 100 | 19 | 0.10 | 5 | −10.1 |
| Comparative Example 12 | 100 | 30 | 0.10 | 3 | −10.0 |

TABLE 1-3

| | Ferromagnetic powder | linear recording density (kbpi) | shortest recording wavelength (nm) | Minimum recording bit length (nm) | Value d which is 1/3 of minimum recording bit length (nm) | Thickness of non-magnetic layer $t_{nonmag}$ (μm) | Amount of red iron oxide in non-magnetic layer |
|---|---|---|---|---|---|---|---|
| Example 13 | SrFe1 | 1270 | 40 | 20 | 6.7 | 0.3 | 100.0 parts by mass |
| Example 14 | SrFe2 | 1270 | 40 | 20 | 6.7 | 0.3 | 100.0 parts by mass |
| Example 15 | ε-iron oxide | 1270 | 40 | 20 | 6.7 | 0.3 | 100.0 parts by mass |
| Comparative Example 13 | SrFe1 | 1270 | 40 | 20 | 6.7 | 1.2 | 100.0 parts by mass |
| Comparative Example 14 | SrFe2 | 1270 | 40 | 20 | 6.7 | 1.2 | 100.0 parts by mass |
| Comparative Example 15 | ε-iron oxide | 1270 | 40 | 20 | 6.7 | 1.2 | 100.0 parts by mass |
| Comparative Example 16 | SrFe1 | 1270 | 40 | 20 | 6.7 | 0.3 | 100.0 parts by mass |
| Comparative Example 17 | SrFe2 | 1270 | 40 | 20 | 6.7 | 0.3 | 100.0 parts by mass |
| Comparative Example 18 | ε-iron oxide | 1270 | 40 | 20 | 6.7 | 0.3 | 100.0 parts by mass |

TABLE 1-3-continued

|  | Thickness of magnetic layer $t_{mag}$ (nm) | Magnetic layer Hk (Oe) | $d/t_{mag}$ | Number of recesses having depth which is 1/3 or more of minimum recording bit length (piece/10000 μm$^2$) | SNR (dB) |
|---|---|---|---|---|---|
| Example 13 | 30 | 25 | 0.22 | 1 | −21.9 |
| Example 14 | 30 | 19 | 0.22 | 2 | −22.5 |
| Example 15 | 30 | 30 | 0.22 | 1 | −21.4 |
| Comparative Example 13 | 30 | 25 | 0.22 | 11 | −24.8 |
| Comparative Example 14 | 30 | 19 | 0.22 | 12 | −25.3 |
| Comparative Example 15 | 30 | 30 | 0.22 | 10 | −24.2 |
| Comparative Example 16 | 70 | 25 | 0.10 | 1 | −24.9 |
| Comparative Example 17 | 70 | 19 | 0.10 | 2 | −24.5 |
| Comparative Example 18 | 70 | 30 | 0.10 | 1 | −24.4 |

From the results shown in Table 1, it can be confirmed that the magnetic tape of the examples including the magnetic layer including ferromagnetic powder selected from the group consisting of the hexagonal strontium ferrite powder and the ε-iron oxide powder has excellent electromagnetic conversion characteristics.

One aspect of the invention is effective in a technical field of a magnetic recording medium for high-density recording.

What is claimed is:

1. A magnetic recording medium comprising:
   a non-magnetic support; and
   a magnetic layer including a ferromagnetic powder,
   wherein the ferromagnetic powder is a ferromagnetic powder selected from the group consisting of a hexagonal strontium ferrite powder and an ε-iron oxide powder,
   the number of recesses having a depth which is 1/3 or more of a minimum recording bit length existing on a surface of the magnetic layer is less than 10/10,000 μm$^2$,
   a ratio $d/t_{mag}$ of a value d which is 1/3 of the minimum recording bit length to a thickness $t_{mag}$ of the magnetic layer is 0.20 to 0.50, and
   the anisotropy magnetic field Hk of the magnetic layer is equal to or greater than 18 kOe.

2. The magnetic recording medium according to claim 1, further comprising:
   a non-magnetic layer including a non-magnetic powder between the non-magnetic support and the magnetic layer.

3. The magnetic recording medium according to claim 1 further comprising:
   a back coating layer including a non-magnetic powder on a surface of the non-magnetic support opposite to a surface provided with the magnetic layer.

4. The magnetic recording medium according to claim 1, wherein the number of recesses is 1/10,000 μm$^2$ to 9/10,000 μm$^2$.

5. The magnetic recording medium according to claim 1, which is a magnetic tape.

6. A magnetic recording and reproducing device comprising:
   the magnetic recording medium according to claim 1; and
   a magnetic head.

7. The magnetic recording and reproducing device according to claim 6,
   wherein a minimum recording bit length of the magnetic recording and reproducing device is 10 nm to 40 nm.

8. The magnetic recording and reproducing device according to claim 6,
   wherein the magnetic recording medium further comprises a non-magnetic layer including a non-magnetic powder between the non-magnetic support and the magnetic layer.

9. The magnetic recording and reproducing device according to claim 6,
   wherein the magnetic recording medium further comprises a back coating layer including a non-magnetic powder on a surface of the non-magnetic support opposite to a surface provided with the magnetic layer.

10. The magnetic recording and reproducing device according to claim 6,
    wherein the number of recesses is 1/10,000 μm$^2$ to 9/10,000 μm$^2$.

11. The magnetic recording and reproducing device according to claim 6,
    wherein the magnetic recording medium is a magnetic tape.

* * * * *